US008036269B2

(12) United States Patent
Kim et al.

(10) Patent No.: US 8,036,269 B2
(45) Date of Patent: Oct. 11, 2011

(54) METHOD FOR ACCESSING MEMORY IN APPARATUS FOR PROCESSING MOVING PICTURES

(75) Inventors: Chan-Yul Kim, Bucheon-si (KR);
Han-Sang Kim, Suwon-si (KR);
Young-Hun Joo, Yongin-si (KR);
Kwang-Pyo Choi, Anyang-si (KR);
Yun-Je Oh, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1023 days.

(21) Appl. No.: 11/975,818

(22) Filed: Oct. 22, 2007

(65) Prior Publication Data

US 2008/0095236 A1    Apr. 24, 2008

(30) Foreign Application Priority Data

Oct. 20, 2006    (KR) .................. 10-2006-0102300

(51) Int. Cl.
*H04N 7/12* (2006.01)
(52) U.S. Cl. ............................. 375/240.13; 375/240.29
(58) Field of Classification Search .................. None
See application file for complete search history.

(56) References Cited

U.S. PATENT DOCUMENTS

| | | | |
|---|---|---|---|
| 6,757,330 B1 | 6/2004 | Hsu | 375/240.17 |
| 2004/0005004 A1* | 1/2004 | Demos | 375/240.08 |
| 2005/0243921 A1* | 11/2005 | Au et al. | 375/240.12 |
| 2005/0281341 A1* | 12/2005 | Gordon et al. | 375/240.25 |
| 2006/0227880 A1* | 10/2006 | Gordon et al. | 375/240.25 |
| 2007/0171969 A1* | 7/2007 | Han et al. | 375/240.1 |
| 2008/0063072 A1* | 3/2008 | Suzuki | 375/240.16 |
| 2008/0317132 A1* | 12/2008 | Zhou et al. | 375/240.16 |

FOREIGN PATENT DOCUMENTS

| | | |
|---|---|---|
| EP | 1610561 | 12/2005 |
| KR | 2002-82536 | 10/2002 |
| KR | 2005-117728 | 12/2005 |

OTHER PUBLICATIONS

Lai, Yu-Lun, et al.; "H.264 Encoder Speed-Up Via Joint Algorithm/Code-Level Optimization;" Proceedings of the SPIE; Bellingham, VA; vol. 5960, No. 1; Jul. 12, 2005; XP 002417947; 12 pgs.
Tamhankar, A., et al.; "An Overview of H.264 / MPEG-4 Part 10;" Video/Image Processing & Multimedia Communications; Piscataway, NJ; IEEE; Jul. 2, 2003; XP 010650106; 51 pgs.

* cited by examiner

*Primary Examiner* — Hong Cho
(74) *Attorney, Agent, or Firm* — Cha & Reiter, LLC

(57) ABSTRACT

A method and apparatus for accessing a memory for processing moving pictures, which loads data from a frame buffer of an external memory, and uses a motion prediction technique. The method includes the steps of: loading, from the frame buffer, pixels of a relevant block of 8×8 size and extra pixel data necessary for an inter prediction while performing the inter prediction of a block of an 8×8 size following division of a macroblock, storing the pixels of the relevant block size of 8×8 and the extra pixel data in an internal cache memory. The stored pixels of the relevant block size of 8×8 and the stored extra pixel data are used; and then the stored pixels of the relevant block size of 8×8 and the stored extra pixel data stored in the cache memory are re-used during an inter prediction of the relevant block size of 8×8 and sub-blocks.

9 Claims, 7 Drawing Sheets

METHOD FOR ACCESSING MEMORY IN APPARATUS FOR PROCESSING MOVING PICTURES

CLAIM OF PRIORITY

This application claims the benefit under 35 U.S.C. §119 (a) from an application entitled "Method For Accessing Memory In Apparatus For Processing Moving Pictures", filed in the Korean Intellectual Property Office on Oct. 20, 2006 and assigned Serial No. 2006-102300, the contents of which are hereby incorporated by reference in its entirety.

BACKGROUND OF THE INVENTION

1. Field of the Invention

The present invention relates to the field of image processing of moving pictures, such as H.264 and Moving Picture Experts Group-4 (MPEG-4). More particularly, the present invention relates to a method for accessing a memory in which images are processed by an apparatus for processing moving pictures, which uses motion estimation techniques and motion compensation techniques.

2. Description of the Related Art

H.264 or MPEG-4 Advanced Video Coding (AVC) corresponds to standard technology that has been established by International Organization for Standardization/International Electrotechnical Commission (ISO/IEC) MPEG, wherein ISO/IEC is an international standardization organization, and Joint Video Team (JVT) is a partnership project of the International Telecommunication Union-Telecommunication standardization sector Video Coding Experts Group (ITU-T VCEG). The H.264 standard has provided improved technologies which distinguish from the existing coding schemes in order to raise the level of coding efficiency. In addition, H.264 permits use of a coding tool, such as an intra prediction using a flexible block size, an in-loop de-blocking filter, a quarter-pixel motion compensation, etc., as typical technology.

In order to design/employ a COder/DECoder (CODEC) in accordance with the above standard in real-time, it is necessary not only to reduce the number of execution cycles, but also to minimize the number of times a memory is accessed. Since frame storage reference buffers of the majority of video CODECs are located at external memories, the frame storage reference buffers require a significant amount of access time relative to other functions performed by the CODECs. The following table (TABLE 1) shows the relative memory access ratio in each function module included in an H.264 decoder.

TABLE 1

| name of module | max bytes of memory access | ratio [%] |
| --- | --- | --- |
| reference picture store | W × H + 2 × (W/2) × (h/2) | 10 |
| de-blocking filter | (W/16) × (H/16 − 1) × 16 × 4 × 2 × 2 | 5 |
| display factor | W × H + 2 × (W/2) × (H/2) | 10 |
| motion compression | (W/16) × (H/16) × 16 × (9 × 9 + 2 × 3 × 3) × 2 | 75 |
| total | ~16 × W × H | |

With regard to the above table, W and H denotes Width and Height, respectively.

As shown in TABLE 1, the greater part of memory accesses are generated by a motion compensation part, which performs the motion compression with the relatively large access requirement ratio. In particular, in a mobile environment, as the rate of an inter prediction increases faster than the rate of an intra prediction, by reducing the number of times memory is accessed in the inter prediction part, there is a greater need to provide a scheme embodying a more efficient decoder than known heretofore.

According to the fact that motion compensation in H.264 has a tree structure, a single macroblock is classified into either 16×16, 16×8, 8×16, or 8×8 groups of pixels, wherein a relevant motion vector is sought in each case, and an image value is predicted at different points in time. The aforementioned is particularly applicable in the instance where a block of 8×8 size is sub-divided into sub-macroblocks of 8×4, 4×8, 4×4 sizes in order to accurately sense detailed motion. At present, when a half-pixel or a quarter-pixel is found, a basic image is enlarged two or four times, respectively, and then the motion prediction can be performed. In order to enlarge the images, in the H.264, pixels are fetched from reference frames by using a six-tap filter, e.g., a six-tap Finite impulse Response (FIR) filter, and then the prediction is performed.

FIG. 1 is a view illustrating the pixels necessary for a 4×4 luminance inter prediction made during general moving picture processing. With reference to FIG. 1, in the case of a block of 4×4 size (hereinafter, referred to as "4×4 block"), in order to find interpolation pixels, such as the half-pixel or the quarter-pixel, etc., by using the six-tap filter, it is additionally required to include two more columns/rows or three more columns/rows that are adjacent to the upper and lower sides, and the left and right of a relevant block besides pixels of the 4×4 block.

For example, in FIG. 1, finding (vertical interpolation) the half-pixel (i.e., an interpolation pixel A0') that is to be vertically interpolated between pixels A0 and A1, in the case where the six-tap filter is used, pixels A_2, A_1, A0, A1, A2, and A3 are used in the interpolation. At this time, weights (i.e., tap values of the six-tap filters) are given to the pixels participating in the interpolation. The tap values (weights) are set to 1, −5, 20, 20, −5, and 1, respectively. Undoubtedly, the number of the pixels participating in the interpolation and the tap values given to the pixels participating in the interpolation can be set in various ways. The following EXPRESSION 1 shows a formula for evaluating a value of the half-pixel A0' by use of a six-tap filter.

$$A0'=(1 \times A\_2 - 5 \times A\_1 + 20 \times A + 20 \times A1 - 5 \times A2 + 1 \times A3)/32 \quad \text{EXPRESSION 1}$$

As in EXPRESSION 1, the interpolation pixel A0' corresponds to the weighted mean of A_2, A_1, A0, A1, A2, and A3 to which adequate weights are assigned.

However, since a reference buffer is located at an external memory during an inter prediction operation, in this particular example, a data byte of a necessary pixel should be loaded to memories L1 and L2 corresponding to an internal Central Processing Unit (CPU) cache memory. At this time, because 4×4 blocks of the number of 16 exist in a worst-case scenario when an inter prediction of one 16×16 macroblock is performed, blocks of the total 1296 [bytes] (from 9×9×16=1296) should be fetched to be read.

Also, in the case of vertical interpolation, filtering should be performed on data that has been loaded to the memories L1 and L2, as an array of memories is not continuous, and thus the number of times the memory is accessed increases. Namely, in the case of 4×4 block, one interpolation pixel is generated with loads of six times, and the greater part of the CPU registers has the number of registers greater than twenty, as more bytes than a maximum of 20 [bytes] cannot be loaded. As the total bytes necessary for the vertical interpolation corresponds to 36 [bytes] (from 9×4=36), when 36

[bytes] are loaded to a register so as to perform filtering on 36 [bytes], the memory is access for two reloads, so that the filtering should be accomplished by two loads. As a result, when considering a case where the register is used to fetch another instruction, many more reloads need to be requested to perform the operation. This relatively large number of reloads adversely impacts the time it takes for operation.

SUMMARY OF THE INVENTION

Accordingly, the present invention has been made in part at least to solve some of the above problems occurring in the prior art, and it is an exemplary aspect of the present invention to provide a method for accessing a memory in a moving picture processing apparatus, which is equipped with more efficient calculation performance than the apparatus has during motion compensation.

In order to accomplish these aspects and other exemplary aspects of the present invention, there is provided a method for accessing a memory in an apparatus for processing moving pictures, which loads data from a frame buffer of an external memory, and uses a motion prediction technique, According to an embodiment of the present invention, the steps may include: loading from the frame buffer a quantity of pixels of a relevant block size of 8×8, and extra pixel data necessary for an inter prediction of the relevant block when performing the inter prediction of a block size of 8×8 following division of a macroblock, storing in an internal cache memory the pixels of the relevant block size of 8×8 and the extra pixel data, and using the stored pixels of the relevant block size of 8×8 and the stored extra pixel data; and reusing the stored pixels of the relevant block size of 8×8 and the extra pixel data stored in the cache memory during the inter prediction of the relevant block size of 8×8 and sub-blocks.

BRIEF DESCRIPTION OF THE DRAWINGS

Examples of the above and other exemplary features, aspects, and advantages of the present invention will be more apparent from the following detailed description taken in conjunction with the accompanying drawings, which have been provided to illustrate certain exemplary aspects and varied configurations of the present invention in which.

DETAILED DESCRIPTION OF THE INVENTION

Figure 1:
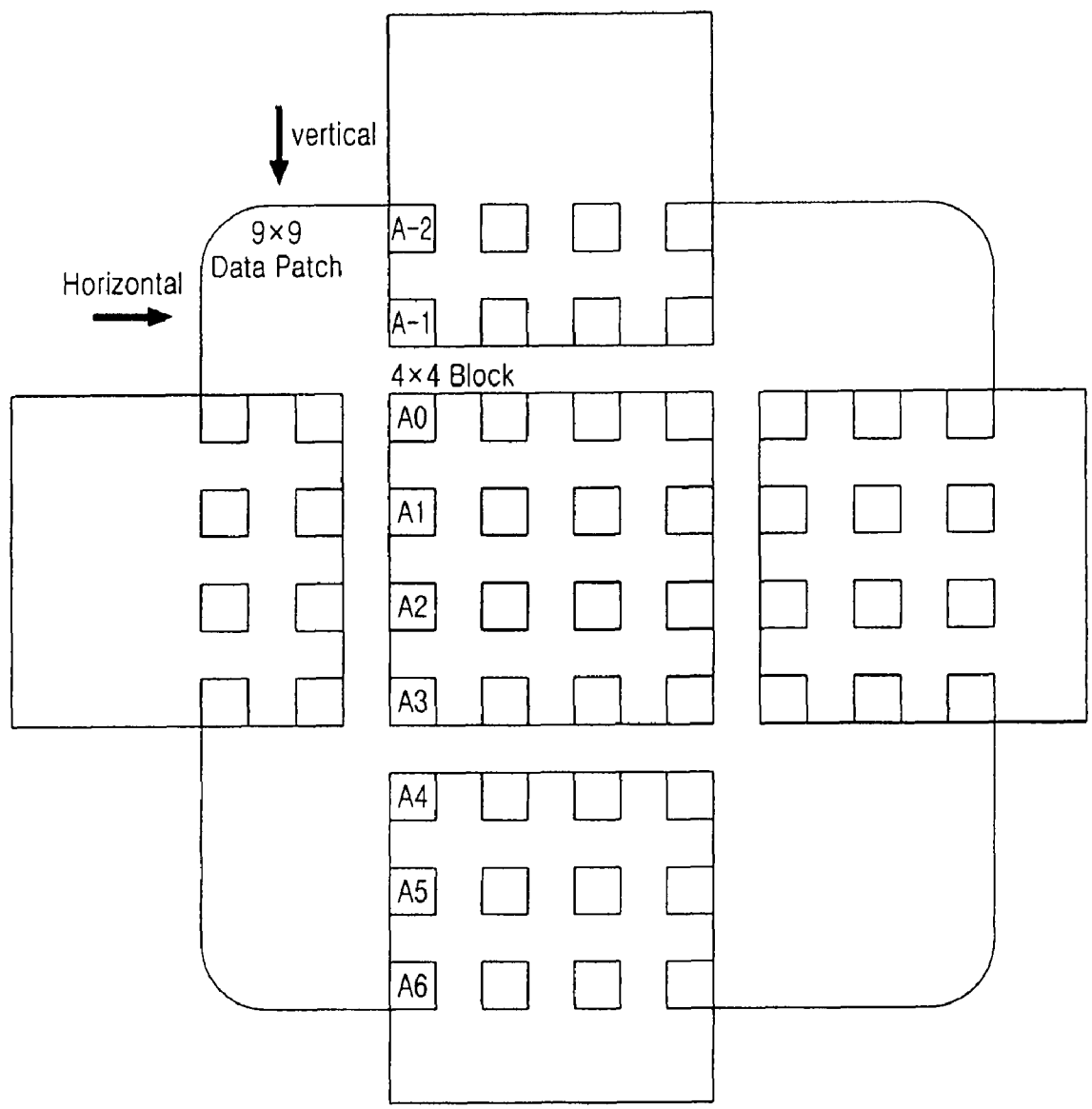
FIG. 1 is a view illustrating pixels necessary for a 4×4 luminance inter prediction during general moving picture processing.

Hereinafter, exemplary embodiments of the present invention, which have been provided for purposes of illustration and not for limitation, shall be described with reference to the accompanying drawings. The same elements will be designated by the same reference numerals all through the following description and drawings although they are shown in different drawings. Further, in the following description of the present invention, a detailed description of known functions and configurations incorporated herein will be omitted when it may obscure the subject matter of the present invention with background information.

Figure 2:
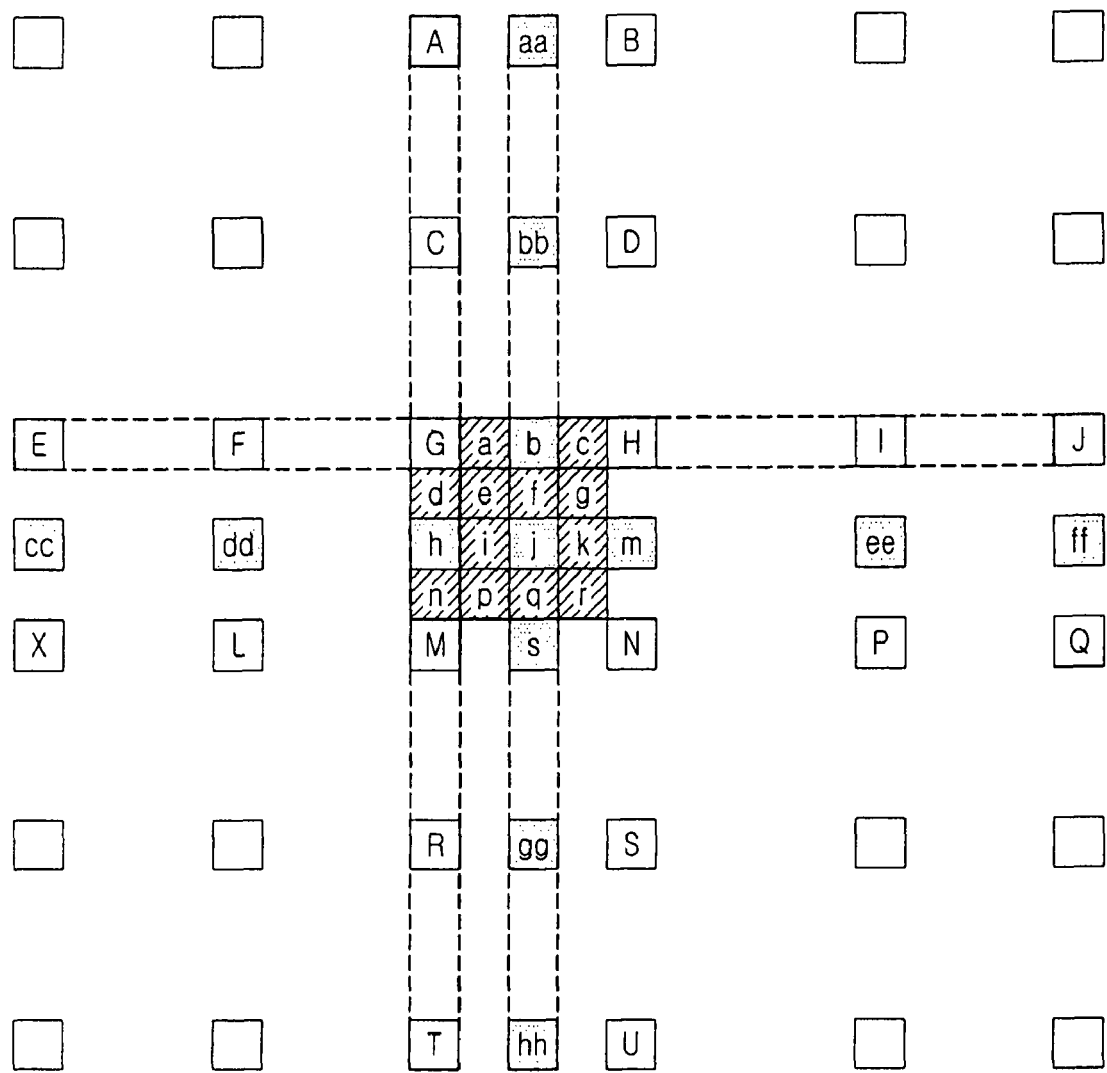
FIG. 2 is a view illustrating a scheme of generating a half-pixel and a quarter-pixel for a 4×4 luminance inter prediction during general moving picture processing.

FIG. 2 is a view illustrating a scheme of generating a half-pixel and a quarter-pixel for a 4×4 luminance inter prediction used during general moving picture processing. To begin with, a typical technology will be specifically described with reference to FIG. 2. As illustrated in FIG. 2, in the case of the performance of half-pixel and quarter-pixel interpolation by using a six-tap filter, first, after the half-pixel (e.g., b, h, j, m, s, etc.) interpolation has been performed in a horizontal direction and in a vertical direction, and a quarter-pixel (a, c, d, e, f, g, l, k, etc.) interpolation to accommodate a motion vector is generated.

Figure 3:
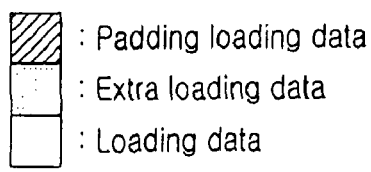
FIG. 3 is a view illustrating readout pixels necessary for a 4×4 luminance inter prediction during general moving picture processing.
Figure 3:
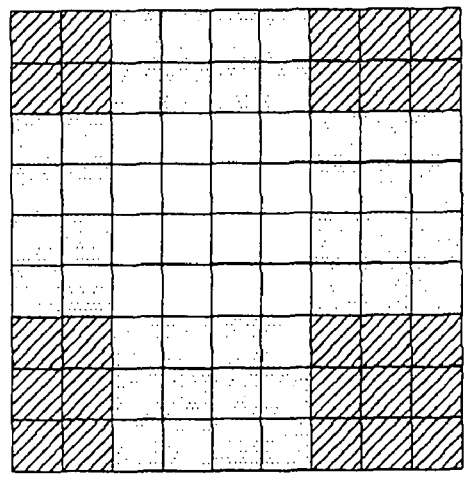

FIG. 3 is a view illustrating a readout of pixels necessary for a 4×4 luminance inter prediction during a general moving picture processing. As illustrated in FIG. 3, it can be understood that in order to interpolate pixels of a single 4×4 block, besides original pixels of the 4×4 block, pixels of a 9×9 block including additional pixels, and pixels loaded in addition to the additional pixels, while loading the additional pixels are read out. In a prior art configuration, whenever a relevant 4×4 block is processed, the pixels of the 9×9 block are loaded from an external memory, are stored in a memory L2, and are processed. Accordingly, it can be understood that the total amount of data loaded from the external memory is 9×9×4=324 [bytes].

Figure 4:
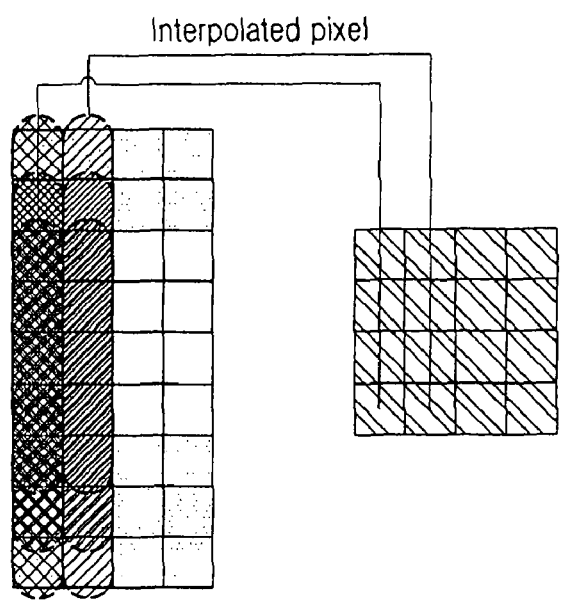
FIG. 4 is a view illustrating a scheme of generating vertical interpolation pixels using a six-tap filter during the luminance inter prediction illustrated in FIG. 3.

FIG. 4 is a view illustrating a scheme of generating vertical interpolation pixels using a six-tap filter during the luminance inter prediction illustrated in FIG. 3. With reference to FIG. 4, in a case where data in a horizontal direction is loaded to a register from the 9×9 block stored in the memory L2, because a memory stride is continuous, after performing a load by the word, a CPU or a Digital Signal Processor (DSP) can carry out an operation of "Multiply and Accumulate" (MAC).

Still, in the case of a load of data in a vertical direction, an address of a memory is moved by each stride, the data in the vertical direction is read in by the byte, and the MAC operation should be performed. In order to perform these functions, based on arithmetic, it is necessary to perform memory accesses of 36 (from 4×9=36) times in the case of a 4×4 block. Actually, as illustrated in FIG. 4, the MAC operation is performed through accesses to the memory L2 of 96 (from 6×4×4=96) times. Also, in order to store 4×4 interpolation pixels generated from a result of a relevant calculation in the external memory, the operations of a total of 16 (from 4×4=16) times are necessary.

In the aforementioned scheme of interpolating pixels in a vertical direction, because the MAC operation is performed after the basic performance of the load operations of six times from the memory L2, the number of MAC operations per cycle is reduced, so that the a resultant degradation of a system is caused.

However, according to the present invention, simultaneously with the reduction of the number of times required to access the external memory during the luminance inter prediction, it is possible to minimize the number of times the memory is accessed in order to facilitate the embodiment of an H.264 decoder in real-time. This reduction in the number of times memory is accessed is caused by changing a typical method for performing the inter prediction in which the calculated filtering is stored in an external memory after calculating filtering, by reading out discontinuous bytes from the memory L2 during the generation of interpolation pixels in a vertical direction. Hereinafter, a description will be made of reducing/minimizing the number of times the memory is accessed and of an embodiment of the H.264 decoder in real-time with reference to the accompanying drawings.

Figure 5:
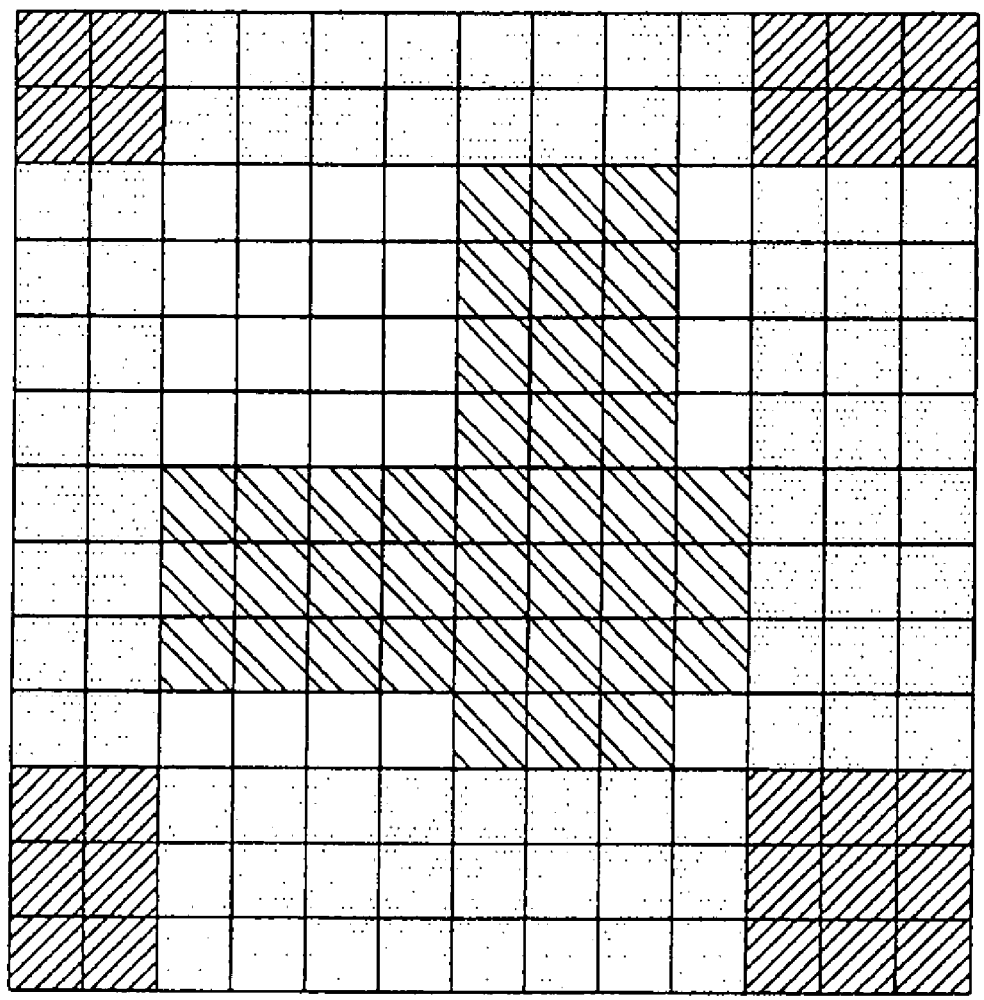
FIG. 5 is a view illustrating the range of pixels for a 4×4 luminance inter prediction during moving picture processing according to an exemplary embodiment of the present invention.

FIG. 5 is a view illustrating the range of pixels for a 4×4 luminance inter prediction during moving picture processing according to an exemplary embodiment of the present invention.

Referring to FIG. 5, according to the present invention, when performing the inter prediction of a 8×8 block following the performance of an inter prediction of 16×16, 8×16, and 16×8 blocks, not only pixels of the 8×8 block but also extra pixel data are loaded to an internal cache memory, i.e. the memory L2. Moreover, the data being loaded is stored in the internal cache memory, and the reloaded data is reused to perform the inter prediction of 8×4, 4×8, and 4×4 blocks.

In other words, according to the present invention, for an inter prediction of a 8×8 block and sub-blocks of the 8×8 block, only data of the total amount of 169 (from 13×13=169) [bytes] is loaded from a frame buffer of an external memory, and the loaded data is used. As illustrated in FIG. 5, in the present invention, for the inter prediction of a single 8×8 block, besides the pixels of the original 8×8 block, pixels of a 13×13 block, including additional pixels and pixels loaded in addition to the additional pixels while loading the additional pixels, are read out, and multiple pixels are reused during the inter prediction by 4×4 blocks out of the pixels of the 8×8 block among these pixels.

When performing the inter prediction of 16×16, 8×16, 16×8, and 8×8 blocks with a tree structure in an inter prediction mode, in the case of 8×8 blocks, there exists inter prediction modes related to three sub-blocks including 4×8, 8×4, and 4×4 blocks. In the existing scheme, after a decoder receives seven modes with the tree structure as it stands, the interpolation operation is performed.

In contrast with the depiction in FIG. 4, in which pixel data is independently read out of a relevant block from the external frame buffer during four modes related to blocks that are less than the 8×8 size block, in the present invention, the 8×8 block size and the extra pixel data are loaded, and therefore, a data load task can be reduced by about 49 [%] during the interpolation operation.

Figure 6:
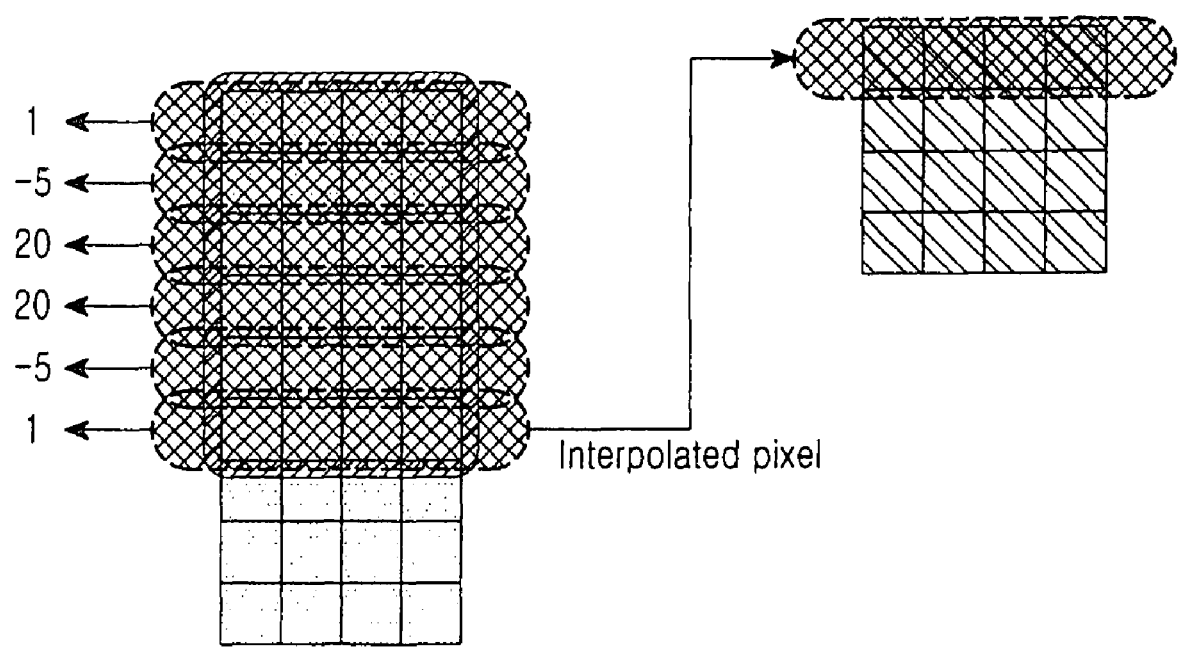
FIG. 6 is a view illustrating a scheme of generating interpolation pixels for a 4×4 luminance inter prediction during moving picture processing according to an exemplary embodiment of the present invention.

FIG. 6 is a view illustrating an exemplary scheme of generating interpolation pixels for a 4×4 luminance inter prediction during moving picture processing according to an exemplary embodiment of the present invention.

With reference to FIG. 6, the vertical interpolation according to this exemplary embodiment of the present invention does not perform a scheme of embodying a FIR filter by loading by the byte from the memory L2 file pixels in pixels of a relevant 4×4 block and additional pixels of the relevant 4×4 block in pixel data of a 13×13 block loaded to the memory L2. In stead, in this exemplary embodiment, there is a separation of coefficients of a filter from the filter. Then, the loading of the pixel data of the relevant 4×4 block by the word is implemented, packing loaded data is executed, so that simultaneous tasks can be accomplished.

Namely, as illustrated in FIG. 6, after a part of the memory L2, in which a memory stride is continuous, is read in to a register by the word (i.e., by the 4 [bytes]), the first load word, the second load word, etc., are respectively loaded to a register % r0, a register % r1, etc., through a packing task among the bytes by the register, and weight is assigned to each load word as illustrated in FIG. 6, and weighted load words are accumulated in the order as according to the following:

an interpolated first vertical pixel=% r0−5×% r1+20×% r2+20×% r3−5×% r4+% r5.

Throughout this task, the first six file words are loaded to six registers in turn, a packing task among the registers is implemented, and each of bytes among sequential data of four bytes generated from the results corresponds to each of four pixels of the first row among 4×4 interpolation pixels. Namely, four interpolation pixels are simultaneously generated following loads of words (six times) from the memory L2. Accordingly, this task is performed four times, and all 4×4 interpolation pixels are generated.

The 4×4 interpolation pixels generated in this way is now able to be stored in the frame buffer of the external memory by the word through the tasks performed a total of four times.

Figure 7:
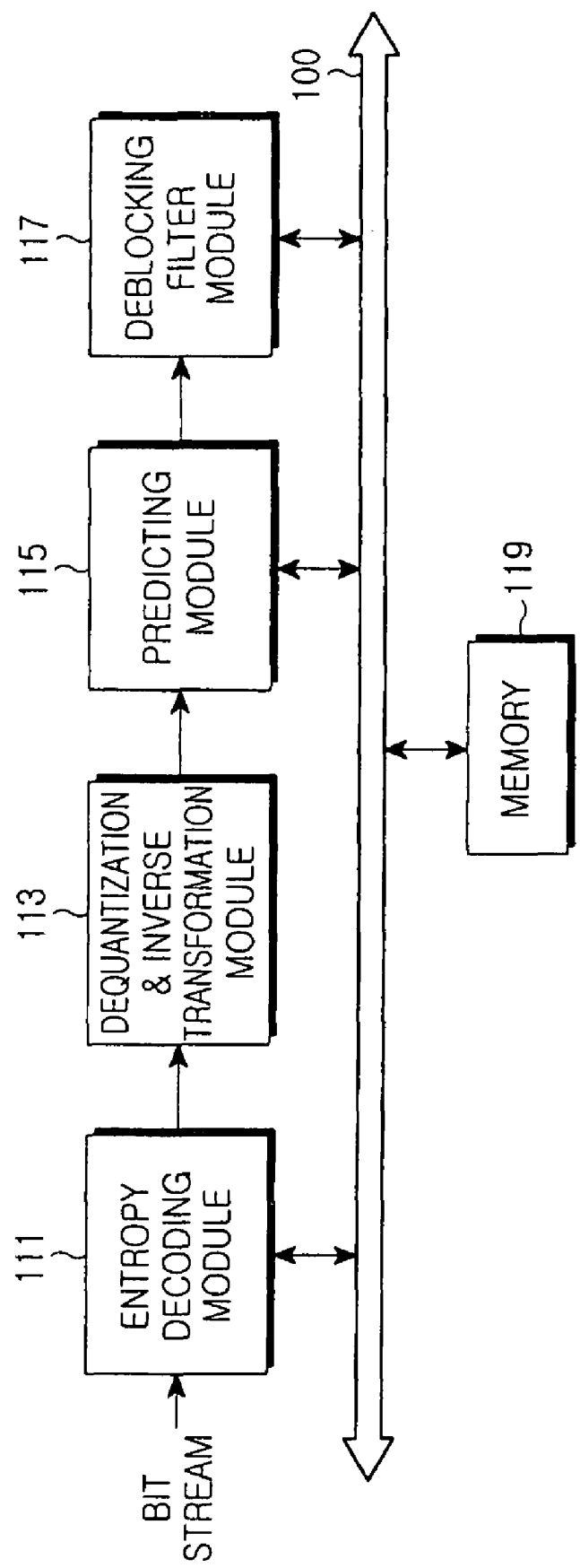
FIG. 7 is a block diagram illustrating a configuration of one of a plurality of moving picture processing apparatuses to which an exemplary embodiment of the present invention can be applied.

FIG. 7 is a block diagram illustrating a configuration of a moving picture processing apparatus to which an exemplary embodiment of the present invention may be applied.

With reference to FIG. 7, a decoder apparatus is configured to perform a procedure in an order opposite to an encoding procedure in an encoder apparatus. First, an entropy decoding module 111 entropy decodes, by the macroblock, a bit stream of a Video Coding Layer (VCL) and of a Network Abstraction Layer (NAL). In the VCL and the NAL, a single frame is divided into a number of slices, one slice is made up of a slice header and data field, and each slice data may typically comprise at least one macroblock.

A dequantization and inverse transformation module 113 dequantizes and restores, e.g., a quantized Discrete Cosine Transform (DCT) coefficient while encoding entropy decoded data, and transforms Discrete Cosine Transformed data into the original data during encoding. Transformed data is provided to a predicting module 115, and is stored in a memory 119 through a data bus 100.

The predicting module 115, according to some of the exemplary aspects discussed above regarding the present invention, performs motion compensation on an input macroblock according to an intra prediction mode, or an inter prediction mode, and restores the original images connected with the current macroblock. A restored result is provided to a deblocking filter module 117, and is then stored in a frame buffer of the external memory 119 through the data bus 100. This predicting module 115 performs the intra prediction and the inter prediction, and performs a luminance inter prediction operation according to the present invention.

The deblocking filter module 117 performs deblocking filtering in order to eliminate a blocking effect among blocks on restored images, a result of the deblocking filtering is output to a back-end, and simultaneously, the result of the deblocking filtering is stored the external memory 119.

The merits and effects of exemplary embodiments, as disclosed in the present invention, and as so configured to operate above, will be described as follows.

Figure 8:
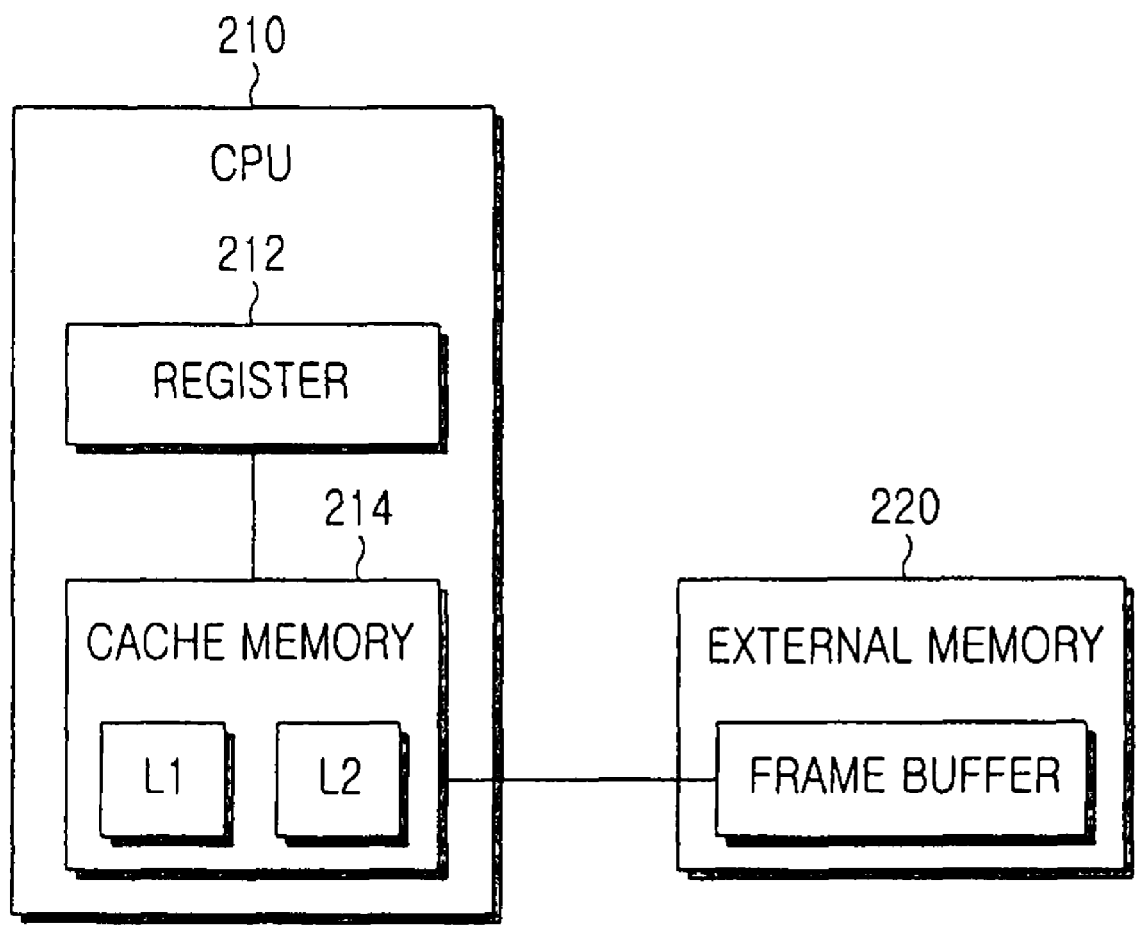
FIG. 8 is a hardware diagram of CPU to which an exemplary embodiment of the present invention is applied.

FIG. 8 is a hardware diagram of CPU to which an exemplary embodiment of the present invention is applied. Referring to FIG. 8, a register (212) and a cache memory (214), that is, L1 and L2, are included into CPU (210), wherein the cache memory (214) loads the pixel data related to the macroblock from the frame buffer of the external memory (220).

As previously discussed, in an apparatus and a method for processing moving pictures according to the present invention, a scheme of accessing a memory makes it possible to reduce/minimize the number of times a memory is accessed during an operation of motion compensation, which causes the apparatus to be equipped with more efficient calculation performance, so that it is possible and practical to embody an H.264 decoder in real-time, which was heretofore unknown.

As described above, in an apparatus for processing moving pictures according to an exemplary embodiment of the invention, there improved performance for accessing a memory can be accomplished that reduces decreases the time required for processing moving pictures. While the invention has been shown and described with reference to certain exemplary embodiments thereof, it will be understood by those skilled in the art that various changes in form and details may be made therein without departing from the spirit and scope of the invention. Therefore, the spirit of the present invention and the scope of appended claims must not be defined and limited to the described exemplary embodiments thereof.

What is claimed is:

1. A method for reducing the number of times an external memory must be accessed when processing moving pictures according to a motion prediction technique, in which data is loaded from a frame buffer of an external memory, the method comprising:
    loading, from the frame buffer, a quantity of pixels of a macroblock of a relevant block size and extra pixel data necessary for performing an inter prediction of said relevant block when performing the inter prediction of said macroblock;
    storing the pixels of the relevant block size and the extra pixel data in an internal cache memory, and using the stored pixels of the relevant block size and the stored extra pixel data to perform a first inter prediction; and
    reusing the stored pixels of the relevant block size and the stored extra pixel data which was stored in the internal cache memory during the inter prediction of the relevant block size and sub-blocks of said relevant block following a division of said macroblock for at least one subsequent inter prediction of the sub-blocks.

2. The method as claimed in claim 1, wherein the relevant block size is 8×8.

3. The method as claimed in claim 2, wherein a packing task among a quantity of bytes of CPU registers is performed, and four interpolation pixels of a row among interpolation pixels of 4×4 size are simultaneously generated, after a part of the cache memory in which a memory stride is continuous, is read into the registers, respectively, by a word size of 4 bytes by a prescribed range, in pixels of a pertinent block size of 4×4 and additional pixels of the pixels of the pertinent block for vertical interpolation, and stored in the cache memory while performing vertical interpolation during an inter prediction of a block of 4×4 size among sub-blocks of the relevant block size of 8×8.

4. The method as claimed in claim 3, wherein the step of reading part of the cache memory into the registers in which the memory stride is continuous to the registers by the word size of 4 bytes by the prescribed range, in the pixels of the pertinent block of 4×4 size and the additional pixels of the pixels of the pertinent block for the vertical interpolation stored in the cache memory, corresponds to loading first, second, third, fourth, fifth, and sixth load words to the % r0, % r2, % r3, % r4, and % r5 registers, and the packing task among the bytes of the registers is performed based on the following EXPRESSION 2:

$$\% \; r0-5\times\% \; r1+20\times\% \; r2+20\times\% \; r3-5\times\% \; r4+\% \; r5.$$

5. The method as claimed in claim 3, wherein the pixels of the relevant block size of 8×8 and extra pixel data correspond to pixel data of a block of 13×13 size.

6. The method as claimed in claim 2, wherein the pixels of the relevant block size of 8×8 and extra pixel data correspond to pixel data of a block of 13×13 size.

7. A method for accessing a memory by an apparatus for processing moving pictures, which loads data from a frame buffer of an external memory to an internal cache memory, and uses a motion prediction technique, the method comprising:
    loading, from the frame buffer in advance, at least pixels of a relevant block of 4×4 size and extra pixel data necessary for an inter prediction while performing the inter prediction of a block of 4×4 size following division of a macroblock;
    storing the pixels of the relevant block of 4×4 size and the extra pixel data in the internal cache memory, and using the stored pixels of the relevant block of 4×4 size and the stored extra pixel data;
    reading a part of the cache memory in which a memory stride is continuous to a plurality of registers, respectively, by a word of 4 bytes by a prescribed range, in the pixels of the relevant block of 4×4 size and additional pixels of the pixels of the relevant block for vertical interpolation, stored in the cache memory; and
    performing a packing task among the bytes of the registers, and generating four interpolation pixels of a row among interpolation pixels of 4×4 size simultaneously.

8. The method as claimed in claim 7, wherein the step of reading the part of the cache memory in which the memory stride is continuous to the registers by the word size of 4 bytes by the prescribed range, in the pixels of the relevant block of 4×4 size and the additional pixels of the pixels of the relevant block for the vertical interpolation stored in the cache memory corresponds to loading first, second, third, fourth, fifth, and sixth load words to the % r0, % r2, % r3, % r4, and % r5 registers, and the packing task among the bytes of the registers is performed based on the following EXPRESSION 2:

$$\% \; r0-5\times\% \; r1+20\times\% \; r2+20\times\% \; r3-5\times\% \; r4+\% \; r5.$$

9. An apparatus for processing moving pictures using an inter prediction technique, comprising:
    an entropy decoding module for decoding an input macroblock of a bit stream;
    a dequantization and inverse transformation module for dequantizing and restoring a quantized Discrete Cosine Transform (DCT) coefficient while encoding entropy decoded data, and for transforming Discrete Cosine Transformed data into original data during encoding;
    a predicting module for receiving the transformed DCT data for performing motion compensation on an input macroblock according to an intra prediction mode, or an inter prediction mode, said predicting module restores original images connected with the input macroblock;
    a deblocking filter module for performing deblocking filtering in order to eliminate a blocking effect among blocks on restored images received from said predicting module;
    an external memory comprising a frame buffer for storing a resultant output of the deblocking filtering;

wherein said predicting module restores original images connected with the input macroblock by loading, from the frame buffer, a quantity of pixels of the macroblock of a relevant block size and extra pixel data necessary for performing an inter prediction of sub-blocks of said macroblock following a division of said macroblock when performing the inter prediction of said macroblock, storing the pixels of the relevant block size and the extra pixel data in an internal cache memory, and using the stored pixels of the relevant block size and the stored extra pixel data to perform a first inter prediction, and reusing the stored pixels of the relevant block size and the stored extra pixel data which was stored in the internal cache memory during the inter prediction of the relevant block size and sub-blocks for subsequent inter predictions of the sub-blocks.

* * * * *